(12) United States Patent
Chen et al.

(10) Patent No.: US 10,382,417 B2
(45) Date of Patent: Aug. 13, 2019

(54) SECURE PROTOCOL FOR CHIP AUTHENTICATION

(71) Applicant: Mentor Graphics Corporation, Wilsonville, OR (US)

(72) Inventors: Michael Chen, Happy Valley, OR (US); Mario Larouche, Lake Oswego, OR (US); Joseph P. Skudlarek, Lake Oswego, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 48 days.

(21) Appl. No.: 14/851,429

(22) Filed: Sep. 11, 2015

(65) Prior Publication Data

US 2017/0063821 A1    Mar. 2, 2017

Related U.S. Application Data

(60) Provisional application No. 62/212,386, filed on Aug. 31, 2015.

(51) Int. Cl.
| | |
|---|---|
| *H04L 29/06* | (2006.01) |
| *G01R 31/28* | (2006.01) |
| *H04L 9/32* | (2006.01) |
| *G09C 1/00* | (2006.01) |
| *H04L 9/08* | (2006.01) |

(52) U.S. Cl.
CPC .......... *H04L 63/08* (2013.01); *G01R 31/2851* (2013.01); *G09C 1/00* (2013.01); *H04L 9/0866* (2013.01); *H04L 9/3234* (2013.01); *H04L 9/3278* (2013.01); *H04L 2209/26* (2013.01)

(58) Field of Classification Search
CPC .... H04L 63/08; H04L 9/3234; G01R 31/2851
See application file for complete search history.

(56) References Cited

U.S. PATENT DOCUMENTS

| | | | | |
|---|---|---|---|---|
| 8,516,269 | B1 * | 8/2013 | Hamlet | G06F 21/445 340/5.8 |
| 8,667,265 | B1 * | 3/2014 | Hamlet | H04L 9/0866 326/80 |
| 8,868,923 | B1 * | 10/2014 | Hamlet | G06F 21/00 326/8 |
| 2003/0204743 | A1 * | 10/2003 | Devadas | G06F 21/31 726/9 |

(Continued)

*Primary Examiner* — Joseph P Hirl
*Assistant Examiner* — J. Brant Murphy
(74) *Attorney, Agent, or Firm* — Mentor Graphics Corporation

(57) ABSTRACT

This application discloses a supply chain security technique that enrolls an integrated circuit with a security server and subsequently utilizes the enrollment to authenticate the integrated circuit. The integrated circuit can include security circuitry to enroll the integrated circuit with the security server by generating an enrollment message—including a fingerprint code having an encoded version of a private value generated by the security circuitry—for transmission to the security server. The security circuitry can authenticate the integrated circuit by replying to a request to verify authentication of the integrated circuit from the security server. The response can confirm to the security server that the integrated circuit includes the private value, which can authenticate the integrated circuit.

20 Claims, 9 Drawing Sheets

(56) References Cited

U.S. PATENT DOCUMENTS

| | | | |
|---|---|---|---|
| 2004/0059924 A1* | 3/2004 | Soto | G06F 21/32 713/186 |
| 2006/0210082 A1* | 9/2006 | Devadas | G06F 21/31 380/277 |
| 2006/0271792 A1* | 11/2006 | Devadas | G06F 21/31 713/189 |
| 2006/0271793 A1* | 11/2006 | Devadas | G06F 21/31 713/189 |
| 2007/0136602 A1* | 6/2007 | Park | G06F 21/313 713/182 |
| 2009/0083833 A1* | 3/2009 | Ziola | G06F 21/31 726/2 |
| 2010/0272255 A1* | 10/2010 | Devadas | G06F 21/31 380/44 |
| 2011/0246817 A1* | 10/2011 | Orsini | G06F 11/1076 714/6.1 |
| 2011/0296440 A1* | 12/2011 | Laurich | G06F 21/602 719/326 |
| 2012/0033810 A1* | 2/2012 | Devadas | G06F 21/31 380/46 |
| 2012/0131340 A1* | 5/2012 | Teuwen | H04L 9/3278 713/168 |
| 2012/0203533 A1* | 8/2012 | Jacobus | G06F 11/261 703/14 |
| 2014/0173709 A1* | 6/2014 | Eldar | H04L 9/3226 726/7 |
| 2016/0149697 A1* | 5/2016 | Doege | G09C 1/00 713/189 |
| 2017/0185761 A1* | 6/2017 | Stanwood | G06F 21/32 |

\* cited by examiner

SECURE PROTOCOL FOR CHIP AUTHENTICATION

RELATED APPLICATION

This patent application claims priority to U.S. Provisional Patent Application No. 62/212,386, filed Aug. 31, 2015, which is incorporated by reference herein.

TECHNICAL FIELD

This application is generally related to electronic design automation and, more specifically, to secure protocol for chip authentication.

BACKGROUND

The supply chain for integrated circuits typically includes a design stage, a manufacturing stage, a distribution stage, and field usage stage. In the design stage, circuit developers can utilize a "design flow" to develop a circuit design representing an electronic device. The particular steps of the design flow often are dependent upon a type of electronic device to be manufactured, its complexity, the design team, and a fabricator or foundry that will manufacture integrated circuits implementing the electronic device. Typically, these circuit developers utilize software and hardware "tools" to help develop and verify the circuit design at various stages of the design flow. The circuit design at the end of the design stage is often specified as a pattern layout design, for example, in a Graphic Database System II (GSDII) format or Open Artwork System Interchange Standard (OASIS) format.

In the manufacturing stage, a fabricator or foundry can manufacture integrated circuit chips that implement the electronic device described in the circuit design. Since many circuit developers utilize third-party fabricators or foundries to manufacture integrated circuit chips implementing the electronic device described in their circuit designs, the lack of direct control over the manufacturing of the chips can lead to various manufacturing-related vulnerabilities, such as unauthorized alteration of the circuit designs, unauthorized reuse or dissemination of circuit designs, unauthorized (over)production of chips implementing the circuit designs, or the like. Some circuit developers attempt to combat these manufacturing-related vulnerabilities by maintaining a physical presence, i.e., stationing personnel, at the manufacturing facility, retrieving masks after production, impose reporting constraints on manufacturers on scrapping wafers, etc. While these attempts can reduce some of the manufacturing-related vulnerabilities, it is often impractical for many circuit developers due to cost and required cooperation by the fabricators. Instead, these circuit developers rely on a subjective level of trust with these third-party fabricators or foundries to ensure that the circuit designs are adequately secured and that unauthorized or counterfeit copies of the chips are not manufactured or distributed.

In the distribution stage, the manufactured integrated circuit chips can be provided to customers for inclusion in their products by distributors. These distributors, however, are typically third-parties, which can also lend itself to other vulnerabilities, such as distribution channel piracy. For example, third-party distributors sometimes sell cheaper parts mislabeled or re-labeled as premium parts. Even though some circuit developers contractually retain distribution rights for their chips or systems, third-party distributors have been known to resell old chips, for example, by unsoldering them from a prior system and then reselling them as new or even as an updated model, and thus failing to abide by their contractual obligations.

Most circuit developers attempt to combat distribution channel piracy by having their manufacturers mark the integrated circuit chips or their associated packaging with some physical indicia, e.g., with DNA paint, with holographic stickers, through laser etching, or the like, which allows both the circuit developers and their customers to assume authenticity of the integrated circuit chips.

SUMMARY

This application discloses a supply chain security technique that enrolls an integrated circuit with a security server and subsequently utilizes the enrollment to authenticate the integrated circuit. The integrated circuit can include security circuitry to enroll the integrated circuit with the security server by generating an enrollment message—including a fingerprint code corresponding to an encoded version of a private value generated by the security circuitry—for transmission to the security server. The security circuitry can authenticate the integrated circuit by replying to a request to verify authentication of the integrated circuit from the security server. In some embodiments, the security circuitry can utilize the private value to determine a response to a challenge in the request to verify authentication, and output the response to the challenge for transmission to the security server. The response can confirm to the security server that the integrated circuit includes the private value, which can authenticate the integrated circuit. Embodiments will be described below in greater detail.

DETAILED DESCRIPTION

Illustrative Operating Environment

The execution of various electronic design automation processes and supply chain security protocols according to embodiments of the invention may be implemented using computer-executable software instructions executed by one or more programmable computing devices. Because these embodiments of the invention may be implemented using software instructions, the components and operation of a programmable computer system on which various embodiments of the invention may be employed will first be described. Further, because of the complexity of some electronic design automation processes, the large size of many circuit designs, and supply chain security protocols, various electronic design automation tools, security servers, or the like, can be configured to operate on a computing system capable of simultaneously running multiple processing threads.

Figure 1:
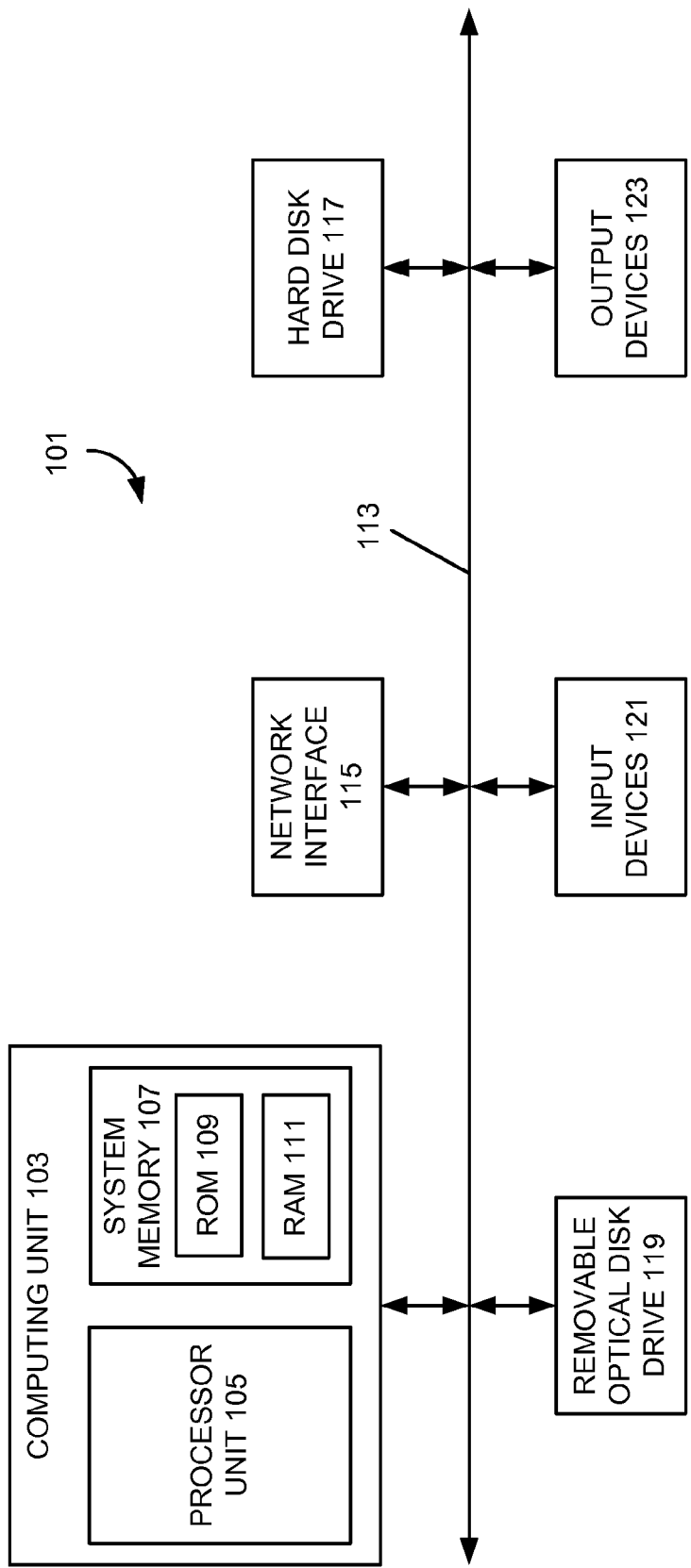
FIGS. 1 and 2 illustrate an example of a computer system of the type that may be used to implement various embodiments of the invention.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
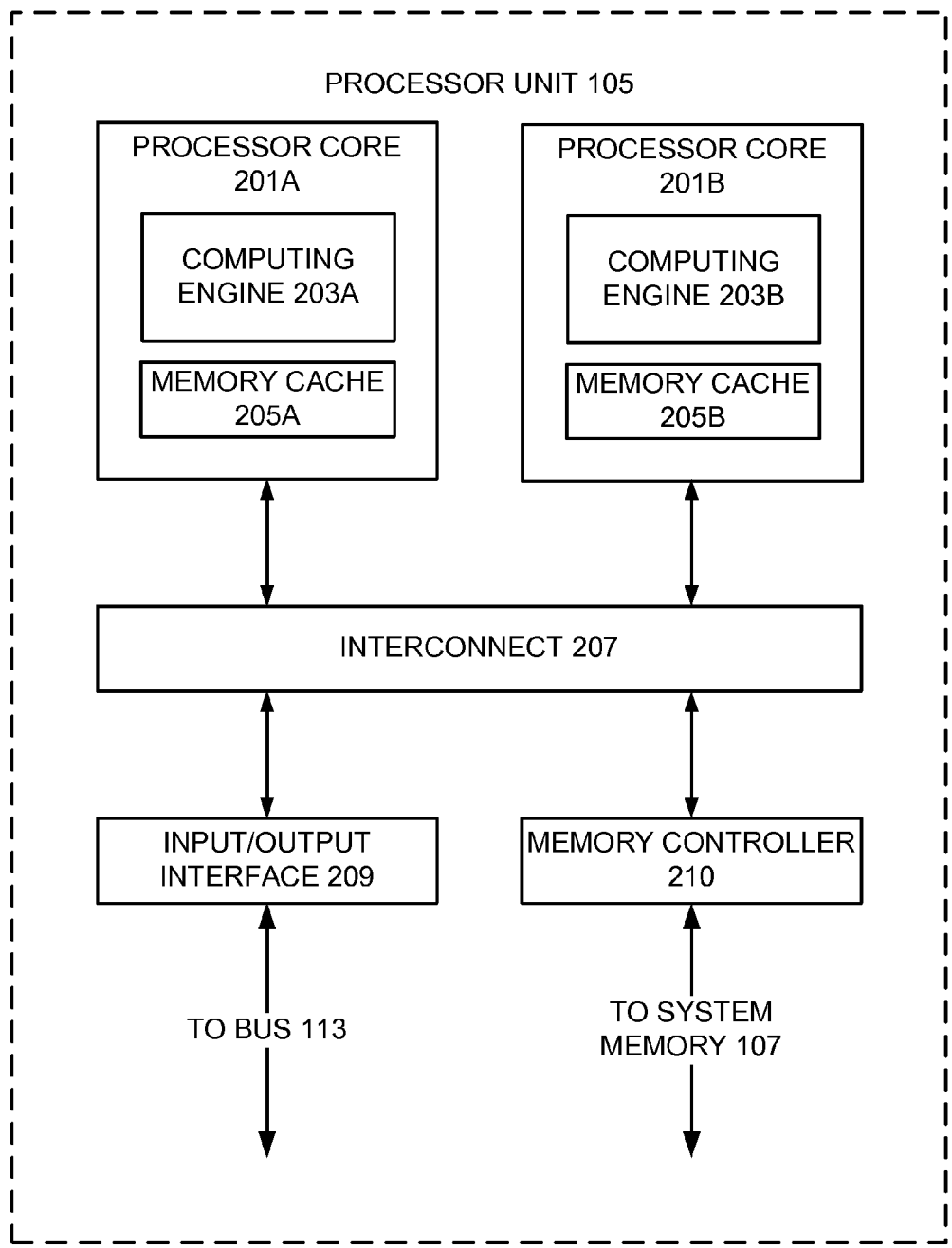

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface between the processor unit 105 and the bus 113. Similarly, the memory controller 210 controls the exchange of information between the processor unit 105 and the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments of the invention.

Security Protocol for Supply Chain Management

Figure 3:
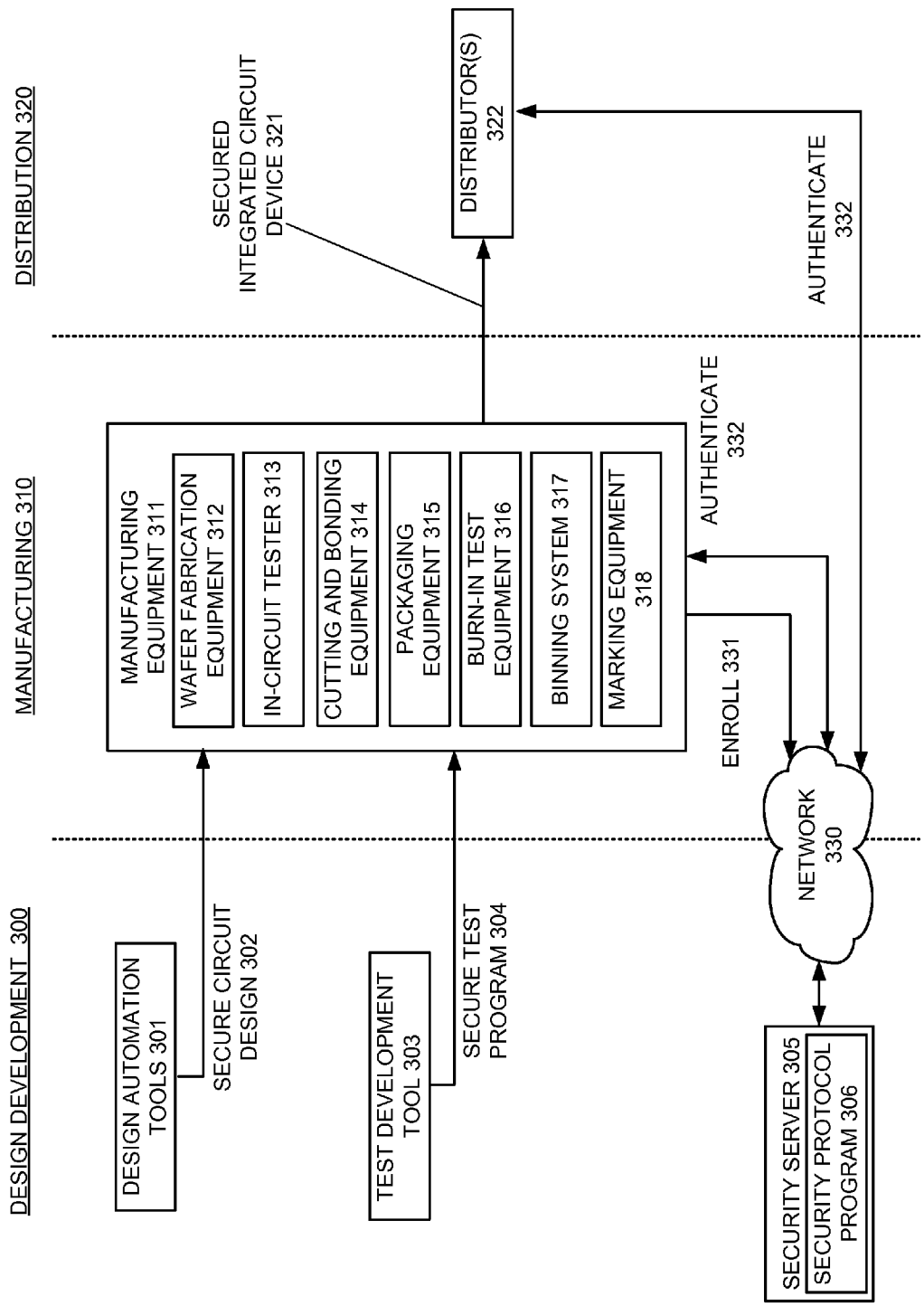
FIG. 3 illustrates an example of a security protocol for supply chain management according to various embodiments of the invention.

FIG. 3 illustrates an example implementation of a security protocol for supply chain management according to various embodiments of the invention. Referring to FIG. 3, a supply chain for an integrated circuit device 321 can include multiple different stages: a design development stage 300, a manufacturing stage 310, and a distribution stage 320. In the design development stage 300, circuit developers can utilize a "design flow" to develop a secure circuit design 302 representing an electronic device. The secure circuit design 302 can be a pattern layout design of the electronic device, for example, in a Graphic Database System II (GSDII) format, Open Artwork System Interchange Standard (OASIS) format, or the like. The circuit developers in the design development stage 300 can utilize one or more design automation tools 301, which can be implemented as described above in FIGS. 1 and 2 or implemented in a hardware deployment, to help develop and verify the secure circuit design 302 at various stages of the design flow.

The design development stage 300 also can develop a secure test program 304, for example, with one or more test development tools 303, such as an automatic test pattern generation (ATPG) tool, which can be implemented as described above in FIGS. 1 and 2. The secure test program 304, when executed by test equipment in the manufacturing stage 310, can direct the test equipment to input test patterns to an electronic device manufactured in the manufacturing stage 310 and, optionally, to log diagnostic information regarding the response of the electronic device to those test patterns.

The manufacturing stage 310 can utilize manufacturing equipment 311 to manufacture a secured integrated circuit device 321 implementing the electronic device described in the secure circuit design 302. The manufacturing stage 310 can include several different phases—including wafer fabrication, in-circuit testing, die cutting, wire bonding, device packaging, burn-in testing, device binning, and device marking—the outcome of which produces the secured integrated circuit device 321 available for distribution to customers.

The wafer fabrication phase, for example, performed by wafer fabrication equipment 312, can perform various semiconductor processing steps, such as deposition, etching or removal, patterning, and doping, which can build an electronic device on each die in a semiconductor wafer. The in-circuit testing phase, for example, performed by an in-circuit tester 313, such as Automatic Test Equipment (ATE) or the like, can implement the secure test program 304 to detect electrical defects in particular dies and optionally may be able to log diagnostic information about a nature of the detected defects that may be used to locate a source of a defect.

The die cutting and wafer bonding phases, for example, performed by cutting and bonding equipment 314, cut the wafer into individual die and attach bond wire to each of die having passed the in-circuit testing. The device packaging phase, for example, performed by packaging equipment 315, can encase the die implementing the electronic device into a supporting case or assembly, which forms the integrated circuit device 321.

The burn-in testing phase, for example, performed by burn-in test equipment 316, can exercise or stress the functionality of the components in the fabricated electronic device, for example, by forcing failures under supervised conditions. The device binning phase, for example, performed by a binning system 317, which can allow the manufacturer to categorize integrated circuit devices according to their capabilities determined by the burn-in testing. The device marking phase, performed by marking equipment 318, can affix or ascribe physical indicia corresponding to the categorization assigned during the device binning phase. In some embodiments, the physical indicia can be adding paint or dye to the secured integrated circuit device 321, or etching the integrated circuit, for example, through a laser etching process.

Once manufactured, the secured integrated circuit device 321 can enter the distribution stage 320, in which one or more distributors 322 can deliver or sell the secured integrated circuit device 321 to a customer. The distribution stage 320 can include one or more sub-contractors, each of which can receive and test the secured integrated circuit device 321 prior to selling or delivering it to the customer. The distributors 322 also can insert the secured integrated circuit device 321 into a product, for example, affixing it to a printed circuit board or the like, and testing the functionality of the secured integrated circuit device 321 while in the product.

Since the stages of the supply chain for the secured integrated circuit device 321 can be distributed and controlled by a variety of parties, companies, or vendors that differ from the circuit developers, the circuit developers in the design development stage 300 can implement a manufacturing security system and associated security protocol to protect against nefarious over-production, recycling, remarking, counterfeit, or otherwise non-authorized manufacture or distribution of integrated circuit devices built according to the secure circuit design 302.

This manufacturing security system and associated security protocol can include the circuit developers adding a description of security circuitry to the secure circuit design 302 in the design development stage 300, for example, with the design automation tools 301, and adding security routines in the secure test program 304, for example, with the test development tool 303. The circuit developers also can maintain a security server 305, which in conjunction with the security routines in the secure test program 304, can enroll 331 and authenticate 332 manufactured integrated circuits in the supply chain over a network 330 based on their corresponding security circuitry. For example, the security server 305 can execute or otherwise implement a security protocol program 306, which can enroll 331 and authenticate 332 manufactured the integrated circuits in the supply chain. The network 330 can be a circuit-switched network, a packet-switched network, or combination thereof, which is capable of establishing a communication between manufacturing equipment 311 and the security server 305. While FIG. 3 shows the security server 305 to enroll 331 and authenticate 332 manufactured integrated circuits in the supply chain over the network 330, in some embodiments, the communication between the security server 305 and either the manufacturing equipment 311 and the distributors 322 can be performed through a physical exchange of storage device, such as a computer-readable disk, flash drive, or other memory storage device. Embodiments of the manufacturing security system and associated security protocol will be described below in greater detail.

Figure 4:
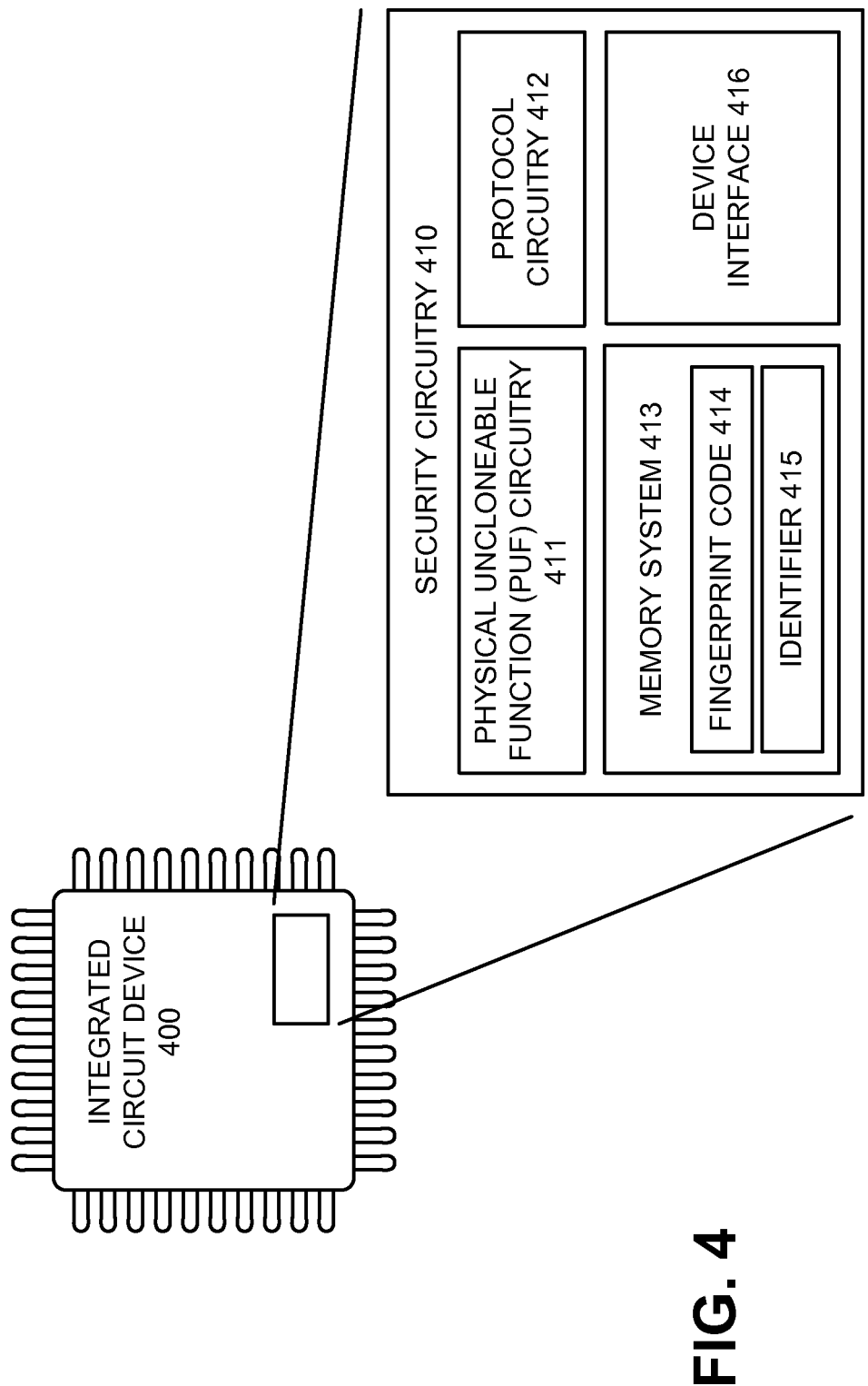
FIG. 4 illustrates an example integrated circuit device including security circuitry according to various examples of the invention.

FIG. 4 illustrates an example integrated circuit device 400 including security circuitry 410 according to various examples of the invention. Referring to FIG. 4, the integrated circuit device 400 can include an integrated circuit manufactured according to a circuit design, and optionally packaged into a supporting case or assembly. The integrated circuit can include the security circuitry 410 to implement at least a portion of a security protocol for authentication of the integrated circuit device 400.

The security circuitry 410 can include physical uncloneable function (PUF) circuitry 411, which may generate a private value based on subtle manufacturing variations in the physical uncloneable function circuitry 411. The private value can be unique or near unique for the integrated circuit device 400. For example, when the physical uncloneable function circuitry 411 includes a static random-access memory (SRAM) device, each cell in the SRAM memory can have different initial states, i.e., set to 0 or 1, depending on manufacturing variations in their respective bi-stable latching circuitry. The physical uncloneable function circuitry 411 can output the private value based on the different initial states of cells in the SRAM. Thus, even though a fabricator or foundry utilized the same manufacturing technique to generate multiple integrated circuit devices implementing the same circuit design, each of the multiple integrated circuits can have security circuitry 410 outputting different private values that can be unique or near unique for each of the respective integrated circuit devices.

In some embodiments, the physical uncloneable function circuitry 411 can encode the private value into a fingerprint code 414, which can be stored in a memory system 413 of the security circuitry 410. This fingerprint code 414 can unique or near unique for the integrated circuit device 400 and, in some embodiments, capable of being decoded into the private value.

The memory system 413 also can store an identifier 415 of the integrated circuit device 400. The identifier 415 can be utilized to differentiate between multiple different integrated circuit devices manufactured according to a common circuit design. In some embodiments, the identifier 415 can correspond to a specific die in a specific wafer used to manufacture the integrated circuit device 400. In other embodiments, the identifier 415 can be assigned by the security circuitry 410, by a test program in test equipment utilized to test the integrated circuit device 400, by a security server, or the like.

The security circuitry 410 can include protocol circuitry 412 to implement the security protocol, for example, generating and interpreting various security messages exchanged with the security server via a device interface 416 of the security circuitry. As will be described below in greater detail, the protocol circuitry 412 can utilize the identifier 415 and the fingerprint code 414 in the memory system 413 to enroll the integrated circuit device 400 with the security server and to subsequently authenticate the integrated circuit device 400 to the security server.

The protocol circuitry 412 also can implement various cryptography and message authentication techniques, which can help protect the security messages being exchanged with the security server. For example, the protocol circuitry 412 can implement a public-private key system allowing the security circuitry 410 to exchange messages with a security server over a possibly unsecure network. The public-private key system can be an Elliptic curve cryptography (ECC) system, for example, utilizing a Diffie-Hellman key agreement protocol, or a Rivest-Shamir-Adelman (RSA) cryptosystem, or the like. The protocol circuitry 412 also can generate message authentication codes (MAC) for inclusion in security messages as well as interpret message authentication codes from received security messages, which can be utilized to detect accidental and intentional changes to the security messages and also affirm an origin of the security messages. These message authentication codes can be a hash-based message authentication code (HMAC), a cipher-based message authentication code (CMAC), or the like.

In some embodiments, the device interface 416 can communicate with test equipment or the like via a local connection, for example, utilizing a Joint Test Action Group (JTAG) protocol codified by one or more of Institute of Electrical and Electronics Engineers (IEEE) Standards 1149.1 or 1149.7, and, as will be discuss below in greater detail, the test equipment can act as an intermediary in the exchange of the security messages between the device interface 416 and the security server.

Figure 5:
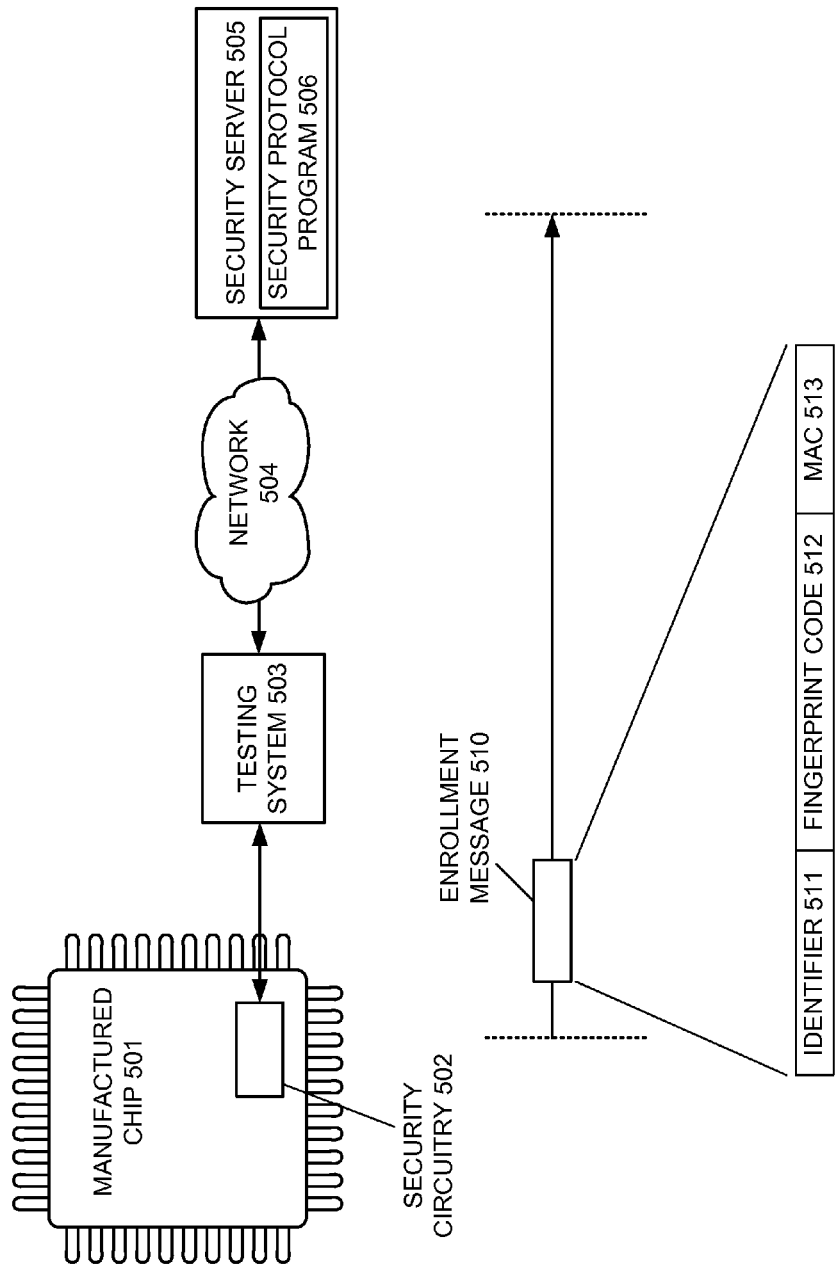
FIGS. 5 and 6 illustrate example enrollment of a manufactured chip according to various embodiments of the invention.
Figure 6:
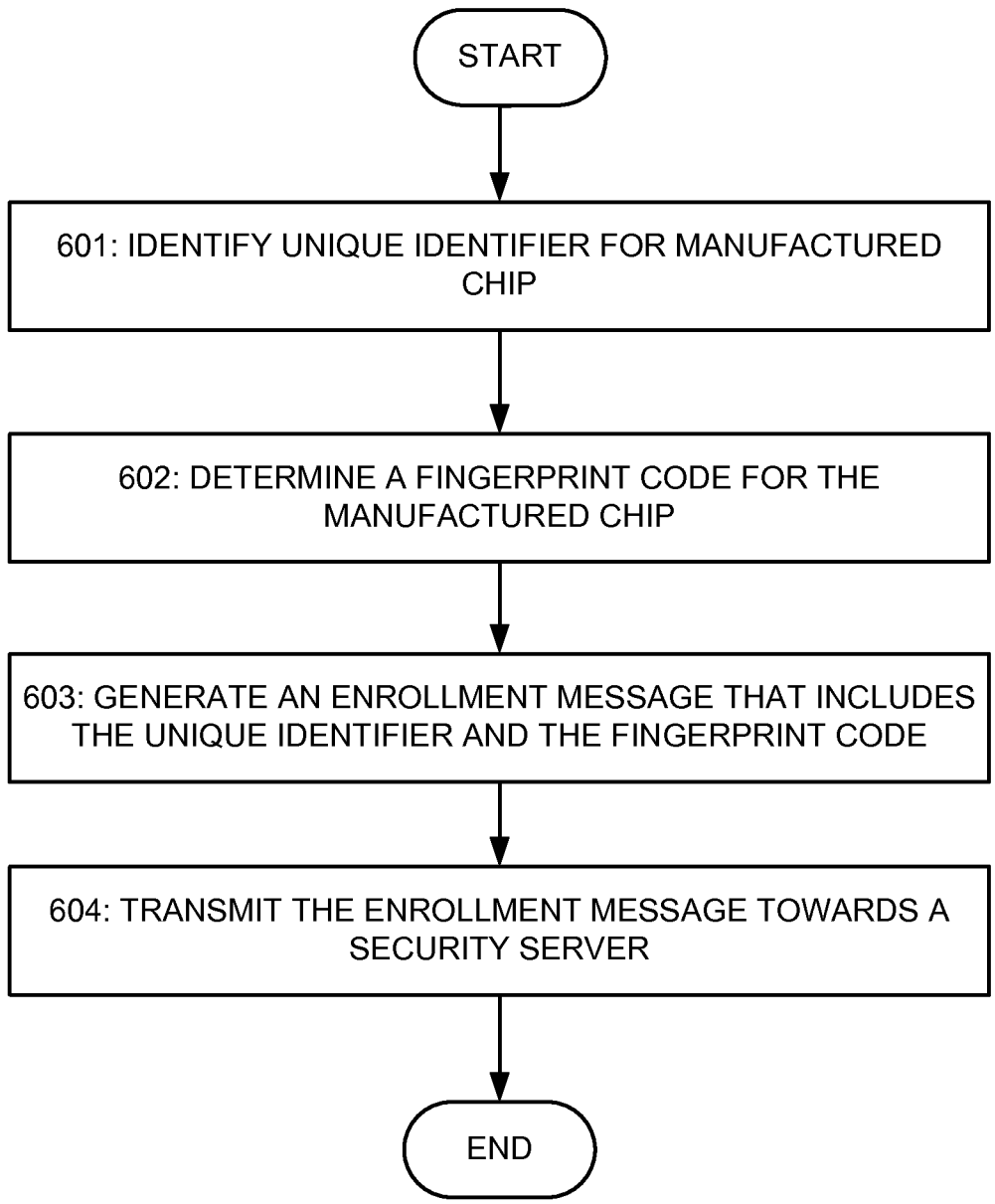

FIGS. 5 and 6 illustrate example enrollment of manufactured chip 501 according to various embodiments of the invention. Referring to FIGS. 5 and 6, in a block 601, the manufactured chip 501 can include security circuitry 502 to identify a unique identifier 511 for the manufactured chip 501. The identifier 511 can be utilized to differentiate between multiple different chips manufactured according to a common circuit design. In some embodiments, the identifier 511 can correspond to a specific die in a specific wafer used to manufacture the chip 501. In other embodiments, the identifier 511 can be assigned by the security circuitry 502, by a test program in a testing system 503 utilized to test the manufactured chip 501, by a security server 505, or the like.

In a block 602, the security circuitry 502 can determine a fingerprint code 512 for the manufactured chip 501. In some embodiments, the security circuitry 502 can include a physical uncloneable function circuitry to generate a private value based on subtle manufacturing variations in the physical uncloneable function circuitry. The security circuitry 502 can encode this private value into the fingerprint code 512, which can be stored in a memory system of the security circuitry 502. This fingerprint code 511 can be unique or near unique for the manufactured chip 501 and, in some embodiments, capable of being decoded back into the private value.

In a block 603, the security circuitry 502 can generate an enrollment message 510 that includes the unique identifier 511 and the fingerprint code 512. In some embodiments, the enrollment message 510 also can include a message authentication code 513, such as a hash-based message authentication code (HMAC), a cipher-based message authentication code (CMAC), or the like. The security server 505 can utilize the message authentication code 513 to detect accidental and intentional changes to the enrollment message 510 and also affirm the enrollment message 510 originated from the security circuitry 502.

In a block 604, the security circuitry 502 can transmit the enrollment message 510 towards the security server 505. In some embodiments, the manufactured chip 501 can be connected to the testing system 503 via a local connection, for example, to perform in-circuit testing of an uncut wafer after manufacture, and the security circuitry 502 can output the enrollment message 510 to equipment in the testing system 503 through the local connection. The security circuitry 502 and the testing system 503 can communicate with a JTAG protocol, for example, codified by one or more of Institute of Electrical and Electronics Engineers (IEEE) Standards 1149.1 or 1149.7. The testing system 503 can transmit the enrollment message 510 to the security server 505 over a network 504. The network 504 can be a circuit-switched network, a packet-switched network, or combination thereof, which is capable of exchanging one or more messages between the testing system 503 and the security server 505.

In some embodiments, since in-circuit testing can be performed rapidly by a fabricator or foundry—the cost of which is often charged by the second—the testing system 503 can store the enrollment message 510 for transmission to the security server 505 at a later time rather than during the in-circuit testing process. This bifurcation or division of the transmission of the enrollment message 510 between the security circuitry 502 and the security server 505, for example, by having the testing system 503 store batches of one or more enrollment messages for subsequent transmission to the security server 505, can allow enrollment of the manufactured chip 501 to be backwards compatible with existing equipment in the testing system 503 and, in some cases, be performed without the knowledge of the manufacturer.

The security server 505, upon receiving the enrollment message 510, can enroll the manufactured chip 501. For example, the security server 505 can execute or otherwise implement a security protocol program 506, which can enroll the manufactured chip 501 in response to the enrollment message 510. The enrollment process performed by the security server 505 implementing the security protocol program 506 can include determining whether the identifier 511 in the enrollment message 510 is valid, decoding the message authentication code 513 to determine both the accuracy and origin of the enrollment message 510, and entering at least the identifier 511 and the fingerprint code 512 into a database. In some embodiments, the security server 505 can decode the fingerprint code 512 into the private value of the manufactured chip 501 and enter the private value into the database in addition to or in lieu of the fingerprint code 512. The security server 505 may determine whether the identifier 511 is valid by comparing the identifier 511 to a known set of valid identifiers, by determining a total number of identifiers 511 previously been entered into the database, i.e., to catch any over-production, or the like. This enrollment process by the security server 505 can be performed without having to have the security server 505 transmit a confirmation of enrollment back to the manufactured chip 501.

Figure 7:
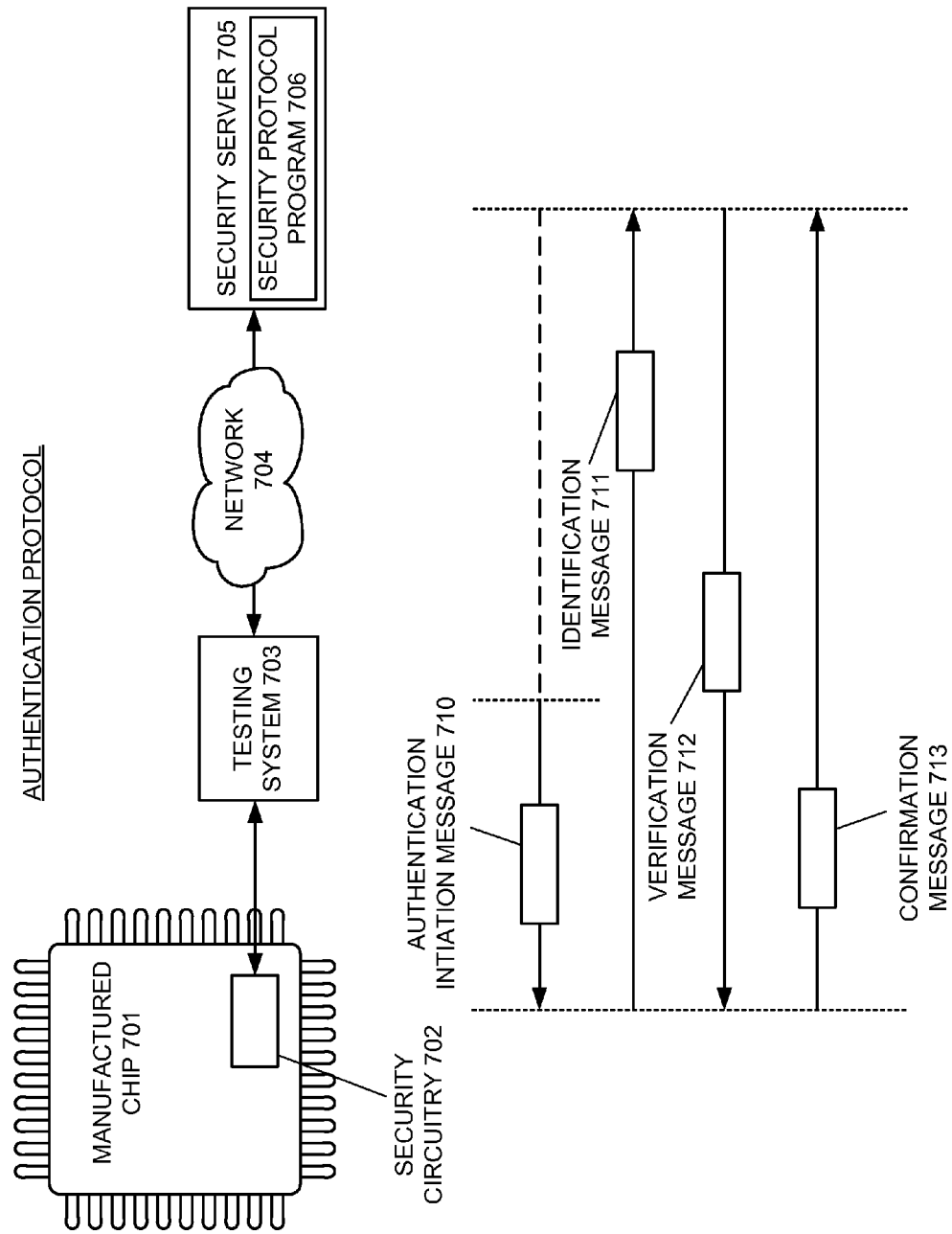
FIGS. 7 and 8 illustrate example authentication of manufactured chip according to various examples of the invention.
Figure 8:
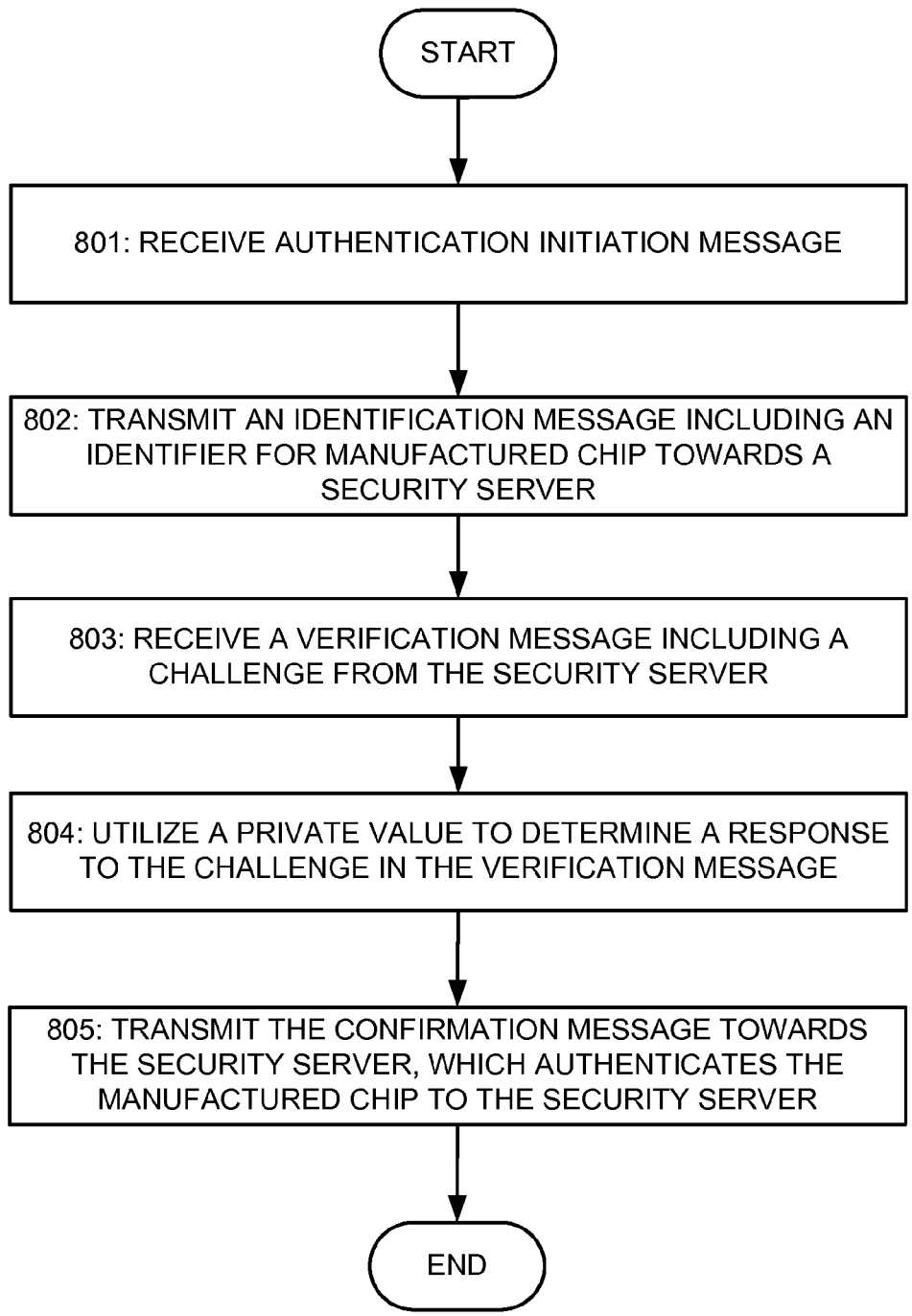

FIGS. 7 and 8 illustrate an example authentication of a manufactured chip 701 according to various examples of the invention. The authentication of the manufactured chip 701 can be performed through a handshake between the manufactured chip 701 and a security server 705 implementing a security protocol program 706. This handshake can identify the manufactured chip 701 to the security server 705 and then confirm that the manufactured chip 701 includes the private value provided by the manufactured chip 701 during enrollment.

Referring to FIGS. 7 and 8, in a block 801, security circuitry 702 in the manufactured chip 701 can receive an authentication initiation message 710. The authentication initiation message 710 can prompt the security circuitry 702 in the manufactured chip 701 to initiate an authentication procedure with the security server 705, which can confirm the identity and authentication of the manufactured chip 701 to the security server 705.

In some embodiments, a testing system 703 implementing a test program can generate the authentication initiation message 710 and provide the authentication initiation message 710 to the manufactured chip 701 via a location connection, for example, utilizing a JTAG protocol. The testing system 703, in some embodiments, can be prompted to provide the authentication initiation message 710 to the manufactured chip 701 in response to various different stimuli or conditions, such as detecting being connected to the manufactured chip 701, receiving information, test output, or the like from the manufactured chip 701, receiving a request from a user interface device, receiving the authentication initiation message 710 from the security server 705, executing a test routine in a test program, a combination thereof, or the like. In some embodiments, the authentication initiation message 710 can be provided to the manufactured chip 701 directly by the security server 705 or by other equipment communicatively coupled to the manufactured chip 701.

In a block 802, the security circuitry 702 can transmit an identification message 711 including an identifier for manufactured chip 701 towards the security server 705. The identifier can be the same identifier previously provided to the security server 705 during enrollment, and can be utilized by the security server 705 to identify, which manufactured chip 701 to attempt to authenticate. The identifier can be utilized to differentiate between multiple different chips manufactured according to a common circuit design. In some embodiments, the identifier can correspond to a specific die in a specific wafer used to manufacture the chip 701. In other embodiments, the identifier could have been assigned by the security circuitry 702, by a test program in a testing system 703 utilized to test the manufactured chip 701, by a security server 705, or the like.

The security circuitry 702 can transmit the identification message 711 towards the security server 705, in some embodiments, by outputting the identification message 711 to an intermediary device, such as the testing system 703 via the local connection. The testing system 703 can transmit the identification message 711 to the security server 705 over a network 704. The network 704 can be a circuit-switched network, a packet-switched network, or combination thereof, which is capable of exchanging one or more messages between the testing system 703 and the security server 705.

In a block 803, the security circuitry 702 can receive a verification message 712 including a challenge from the security server 705 implementing the security protocol program 706. In some embodiments, an intermediary device, such as the testing system 703, can receive the verification message 712 from the security server 705 over the network 704, and forward the verification message 712 to the security circuitry 702 via the local connection.

As will be described below in greater detail, the security server 705 implementing the security protocol program 706 can generate different challenges for the security circuitry 702. This ability of the security server 705 to generate multiple different challenges can make it difficult for a non-authentic device to mimic the manufactured chip 701 by eavesdropping on a prior authentication process between the manufactured chip 701 and the security server 705.

In a block 804, the security circuitry 702 can utilize a private value to determine a response to the challenge in the verification message 712. In some embodiments, the security circuitry 702 can include a physical uncloneable function circuitry to generate the private value based on subtle manufacturing variations in the physical uncloneable function circuitry. The security circuitry 702 can utilize the challenge and the private value to generate the response, for example, by performing a mathematical or other value manipulation on the challenge with the private value to determine the response.

In a block 805, the security circuitry 702 can transmit the confirmation message 713 towards the security server 705, which allows the security server 705 to determine whether the manufactured chip 701 is authentic. The security circuitry 702 can transmit the confirmation message 713 towards the security server 705, in some embodiments, by outputting the confirmation message 713 to an intermediary device, such as the testing system 703, via the local connection. The testing system 703 can transmit the confirmation message 713 to the security server 705 over the network 704.

In some embodiments, the security circuitry 702 and the security server 705 can establish a secured channel between them to communicate. In such situations, the challenge-response authentication portion of the security protocol, described above in blocks 803-805, can be optionally eliminated. Instead, the security server 705 can generate a verification message configured to prompt the security circuitry 702 to send a confirmation message that includes the fingerprint code. The combination of having established a secured channel between the security circuitry 702 and the security server 705 and having the security server 705 receive a confirmation message that includes the fingerprint code, can confirm the security circuitry 702 includes the private value encoded in the fingerprint code, and thus allow the security server 705 to authenticate the manufactured chip 701.

Figure 9:
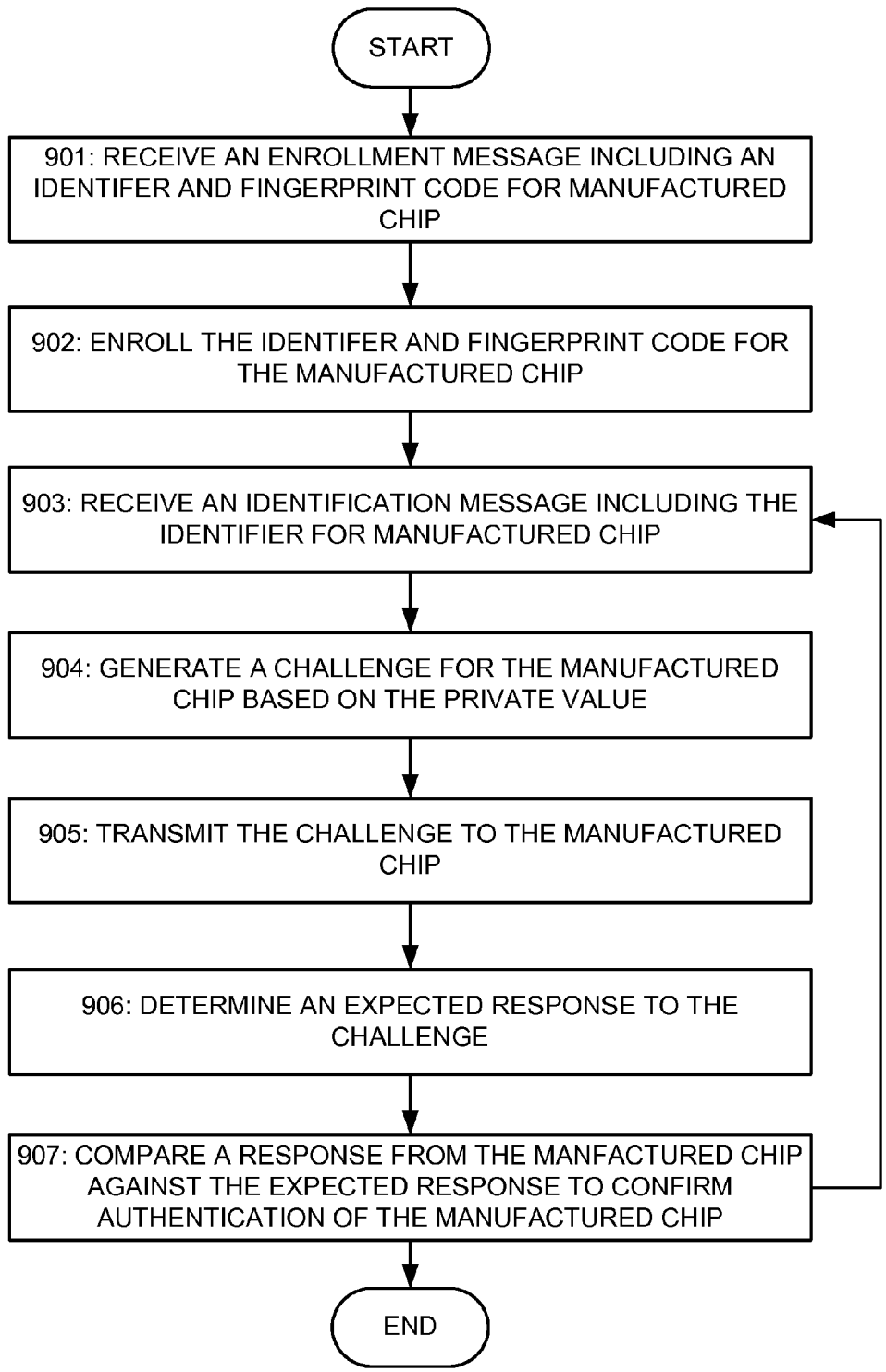
FIG. 9 illustrates example enrollment and authentication of a manufactured chip by a security server according to various examples of the invention.

FIG. 9 illustrates example enrollment and authentication of a manufactured chip by a security server according to various examples of the invention. Referring to FIG. 9, in a block 901, the security server can receive an enrollment message including an identifier and fingerprint code for manufactured chip. The identifier can be utilized to differentiate between multiple different chips manufactured according to a common circuit design. In some embodiments, the identifier can correspond to a specific die in a specific wafer used to manufacture the chip. In other embodiments, the identifier can be assigned by the security circuitry, by a test program in a testing system utilized to test the manufactured chip, by a security server, or the like. The fingerprint code can be unique or near unique for the manufactured chip, and, in some embodiments, based on a private value generated by security circuitry in the manufactured chip. For example, the security circuitry can include a physical uncloneable function circuitry to generate a private value based on subtle manufacturing variations in the physical uncloneable function circuitry.

In some embodiments, the enrollment message can be encrypted and/or include a message authentication code. The security server can be configured to decrypt the enrollment message and/or utilize the message authentication code to determine whether the enrollment message was altered during transmission to the security server and to confirm the origin of the enrollment message.

In a block 902, the security server can enroll the manufacture chip with the security server in response to the enrollment message. The enrollment process performed by the security server can include determining whether the identifier in the enrollment message is valid, decoding the message authentication code to determine both the accuracy and origin of the enrollment message, and entering at least the identifier and the fingerprint code into a database. In some embodiments, the security server can decode the fingerprint code into the private value of the manufactured chip and enter the private value into the database in addition to or in lieu of the fingerprint code. The security server may determine whether the identifier is valid by comparing the identifier to a known set of valid identifiers, by determining a total number of identifiers previously been entered into the database, i.e., to catch any over-production, or the like.

In a block 903, the security server can receive an identification message including the identifier for the manufactured chip. Reception of the identification message can indicate to the security server that an authentication process for the manufactured chip has been initiated. The identifier can be the same identifier previously provided to the security server during enrollment, and can be utilized by the security server to identify, which manufactured chip to attempt to authenticate. In some embodiments, there can be a time delay between enrollment of the manufactured chip, e.g., in block 902, and authentication of the manufactured chip, e.g. in block 903.

In a block 904, the security server can generate a challenge for the manufactured chip based on the private value associated with the identifier in the identification message, and, in a block 905, the security server can transmit the challenge to the manufactured chip in a verification message. In some embodiments, the challenge can correspond to a value that when manipulated with the private value can generate a specific response. This manipulation can be irreversible, i.e., if an eavesdropping party intercepts both the challenge value and the specific response they will not be able to determine the private value (or at least not be able to do so quickly or efficiently). In some embodiments, the challenge or the type of manipulation, such as a hash, cipher, or the like, can vary.

In a block 906, the security server can determine an expected response to the challenge, and, in a block 907, the security server can compare a response from the manufactured chip against the expected response to confirm authentication of the manufactured chip. Since the security server understands how an authentic manufactured chip should manipulate the challenge with its private value, the security server can perform the same manipulation of the private value and the challenge to generate the expected response. When the expected response determined by the security server matches the response to the challenge received from the manufactured chip, the security server can confirm authentication of the manufactured chip or at least the manufactured chip responding to the challenge is the same manufactured chip that sent the enrollment message. The security server, based on the authentication, also can perform additional operations, such as report the authenticity of the manufactured chip to a customer, distributor, or the like, or transmit a message to the manufactured chip that can activate or deactivate at least a portion of the functionality of the manufactured chip.

In some embodiments, the security circuitry and the security server can establish a secured channel between them to communicate. In such situations, the challenge-response authentication portion of the security protocol, described above in blocks 904-907, can be optionally eliminated. Instead, the security server can generate a verification message configured to prompt the security circuitry to send a confirmation message that includes the fingerprint code. The combination of having established a secured channel between the security circuitry and the security server and having the security server receive a confirmation message that includes the fingerprint code, can confirm the security circuitry 702 includes the private value encoded in the fingerprint code, and thus allow the security server to authenticate the manufactured chip.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, NVRAM, OTP, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   generating, by security circuitry in an integrated circuit, an encoded version of a private value based, at least in part, on physical characteristics of the security circuitry set during manufacturing;
   generating, by the security circuitry, an enrollment message that includes the encoded version of the private value, wherein the enrollment message further includes an identifier assigned to the integrated circuit that is separate from the encoded version of the private value in the enrollment message;
   transmitting, by the security circuitry, the enrollment message towards a security server, wherein the security server is configured to enroll the integrated circuit in response to the enrollment message by determining the identifier in the enrollment message corresponds a valid identifier for the integrated circuit and by separately associating the integrated circuit to the private value in the enrollment message and to the identifier corresponding to the valid identifier; and
   replying, by the security circuitry, to a request to verify authentication of the integrated circuit from the security server by outputting, for transmission to the security server, a confirmation message configured to confirm that the integrated circuit includes the private value.

2. The method of claim 1, wherein the private value corresponds to physical characteristics of a physical uncloneable function device in the security circuitry.

3. The method of claim 1, wherein replying to the request to verify authentication of the integrated circuit further comprises:
   utilizing, by the security circuitry, the private value to determine a response to a challenge in the request to verify authentication of the integrated circuit, wherein the response is configured to confirm that the integrated circuit includes the private value; and
   outputting, by the security circuitry, the response to the challenge in the confirmation message for transmission to the security server.

4. The method of claim 3, wherein the challenge for the security circuitry is generated by the security server based, at least in part, on the encoded version of the private value in the enrollment message.

5. The method of claim 1, wherein the enrollment message is configured to prompt enrollment of the integrated circuit with the security server.

6. The method of claim 1, wherein the identifier is configured to uniquely identify the integrated circuit, and further comprising outputting, by the security circuitry, an identification message that includes the identifier of the integrated circuit for transmission to the security server, wherein the security server is configured to generate the request to verify authentication of the integrated circuit in response to the identification message.

7. The method of claim 1, wherein the security circuitry is configured to communicate with the security server via a circuit testing system.

8. An apparatus comprising at least one computer-readable memory device storing instructions configured to cause one or more processing devices to perform operations comprising:
   enrolling an integrated circuit in response to an enrollment message received from the integrated circuit by determining an identifier in the enrollment message corresponds a valid identifier for the integrated circuit and by separately associating the integrated circuit to a private value in the enrollment message and to the identifier corresponding to the valid identifier, wherein the enrollment message includes the identifier assigned to the integrated circuit and further includes an encoded version of the private value that is separate from the identifier, wherein the encoded version of the private value is generated by security circuitry in the integrated circuit based, at least in part, on physical characteristics of the security circuitry set during manufacturing;

generating a request to verify authentication of the integrated circuit for transmission to the integrated circuit; and determining whether a confirmation message received from the integrated circuit in response to the request to verify authentication of the integrated circuit confirms that the integrated circuit includes the private value.

9. The system of claim 8, wherein the private value corresponds to physical characteristics of a physical uncloneable function device in the integrated circuit.

10. The system of claim 8, wherein the instructions are further configured to cause the one or more processing devices to perform operations comprising:

generating a challenge for the integrated circuit based, at least in part, on the encoded version of the private value in the enrollment message;

transmitting, to the integrated circuit, the challenge in the request to verify authentication of the integrated circuit; and comparing a response to the challenge received from the integrated circuit against an expected response to the challenge to confirm that the integrated circuit includes the private value.

11. The system of claim 10, wherein the instructions are further configured to cause the one or more processing devices to perform operations comprising determining the expected response to the challenge based, at least in part, on the encoded version of the private value in the enrollment message.

12. The system of claim 8, wherein the instructions are further configured to cause the one or more processing devices to perform operations comprising decoding the encoded version of the private value in the enrollment message to ascertain the private value of the integrated circuit.

13. The system of claim 8, wherein the security circuitry is configured to communicate with the security server via a circuit testing system.

14. A system comprising:

means for generating an encoded version of a private value based, at least in part, on physical characteristics of the security circuitry set during manufacturing;

means for generating an enrollment message that includes the encoded version of the private value, wherein the enrollment message further includes an identifier assigned to the integrated circuit that is separate from the encoded version of the private value in the enrollment message;

an interface device configured to transmit the enrollment message towards a security server, wherein the security server is configured to enroll the integrated circuit in response to the enrollment message by determining the identifier in the enrollment message corresponds a valid identifier for the integrated circuit and by separately associating the integrated circuit to the private value in the enrollment message and to the identifier corresponding to the valid identifier, and wherein the interface device is configured to receive a request to verify authentication of the integrated circuit; and means for generating a confirmation message in response to the request to verify authentication of the integrated circuit, wherein the confirmation message is configured to confirm that the integrated circuit includes the private value, and wherein the interface device is configured to output the confirmation message for transmission to the security server.

15. The system of claim 14, wherein the private value corresponds to physical characteristics of a physical uncloneable function device in the integrated circuit.

16. The system of claim 14, wherein the request to verify authentication of the integrated circuit includes a challenge to test whether the integrated circuit includes the private value and wherein the means for generating the confirmation message is configured to utilize the encoded version of the private value to determine a response to a challenge in the request to verify authentication of the integrated circuit, the response being configured to confirm that the integrated circuit includes the private value.

17. The system of claim 14, wherein the challenge is generated by the security server based, at least in part, on the encoded version of the private value in the enrollment message.

18. The system of claim 14, wherein the enrollment message is configured to prompt enrollment of the integrated circuit with the security server.

19. The system of claim 14, wherein the identifier configured to uniquely identify the integrated circuit, and wherein the interface device is configured to output an identification message that includes the identifier of the integrated circuit for transmission to the security server, wherein the security server is configured to generate the request to verify authentication of the integrated circuit in response to the identification message.

20. The system of claim 14, wherein the interface device is configured to communicate with the security server via a circuit testing system.

* * * * *